July 17, 1962  R. F. WORLIDGE  3,044,319
IMPROVEMENTS IN OR RELATING TO GEARBOXES
Filed May 15, 1959  4 Sheets-Sheet 1

INVENTOR
RONALD FREDERICK WORLIDGE
By Hane and Nydick
ATTORNEYS

July 17, 1962  R. F. WORLIDGE  3,044,319
IMPROVEMENTS IN OR RELATING TO GEARBOXES
Filed May 15, 1959  4 Sheets-Sheet 3

INVENTOR
RONALD F. WORLIDGE
BY Hane & Nydick
ATTORNEY

July 17, 1962  R. F. WORLIDGE  3,044,319
IMPROVEMENTS IN OR RELATING TO GEARBOXES
Filed May 15, 1959  4 Sheets-Sheet 4

INVENTOR
RONALD FREDERICK WORLIDGE

By Hane and Nydick
ATTORNEYS

United States Patent Office 3,044,319
Patented July 17, 1962

3,044,319
IMPROVEMENTS IN OR RELATING TO
GEARBOXES
Ronald F. Worlidge, Parkstone, Poole, Dorset, England, assignor of one-half to Scott Engineering (Bournemouth) Limited, Parkstone, Poole, Dorset, England, a British company
Filed May 15, 1959, Ser. No. 813,383
Claims priority, application Great Britain May 19, 1958
7 Claims. (Cl. 74—665)

This invention is concerned with improvements in or relating to gearboxes and more particularly with the provision of an improved gearbox for a variable delivery high pressure hydraulic pump.

According to the present invention there is provided a gearbox comprising a rotatable driving member and a first rotatable driven member, one of said members having teeth in each of which the ends are angularly offset about the axis of rotation relative to one another, and means being provided for controlling axial displacement of one of said members during rotation to vary the angular displacement of one member about its axis for a given angular disposition of the other member relative to its axis.

In order that the present invention may be well understood there will now be described one embodiment, given by way of example only, reference being made to the accompanying drawings in which.

Figure 1:
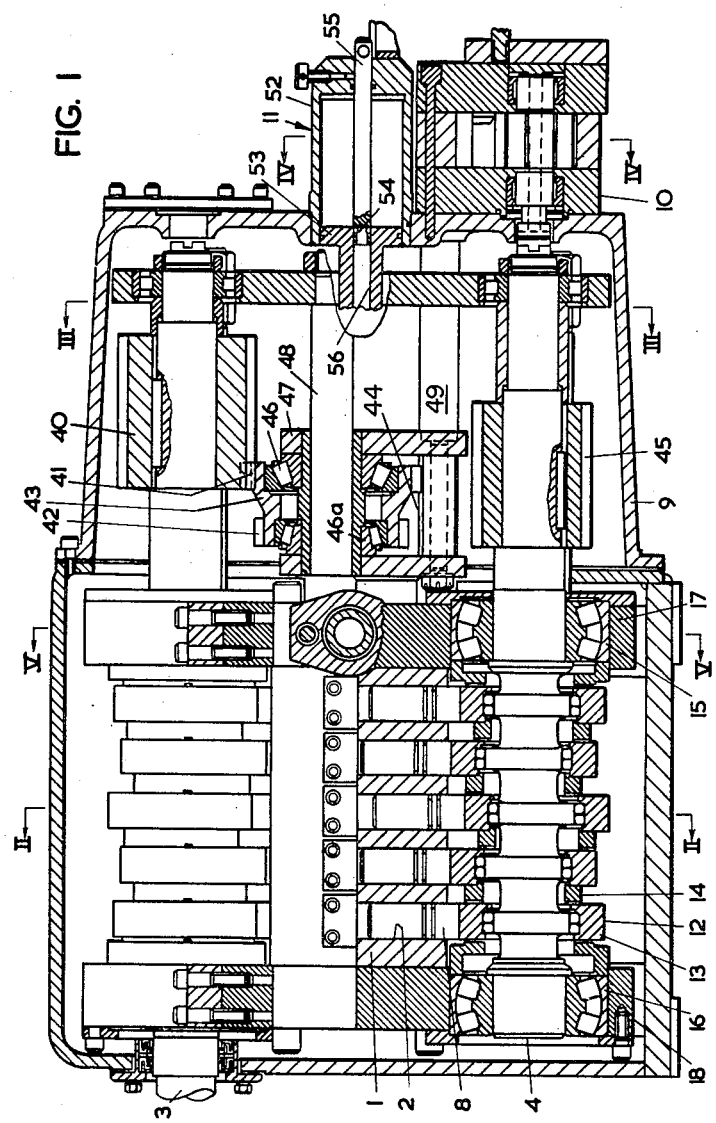
FIGURE 1 is a cross-section of a pump taken along the line I—I of FIGURE 2.
Figure 2:
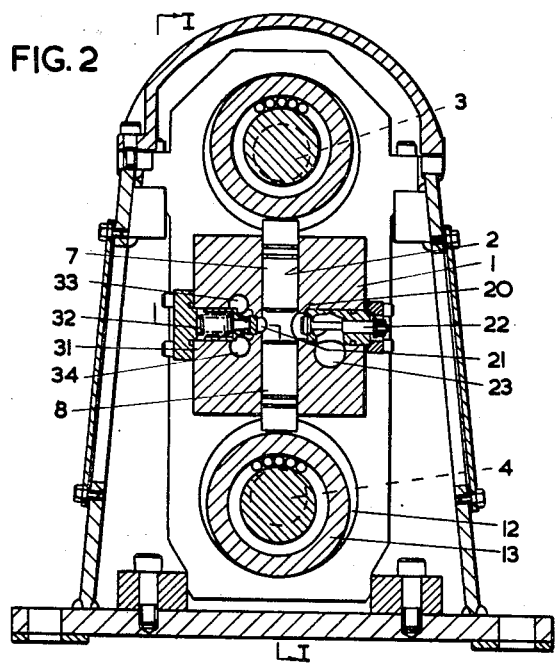
FIGURE 2 is a transverse cross-section of the pump taken along the line II—II of FIGURE 1.
Figure 3:
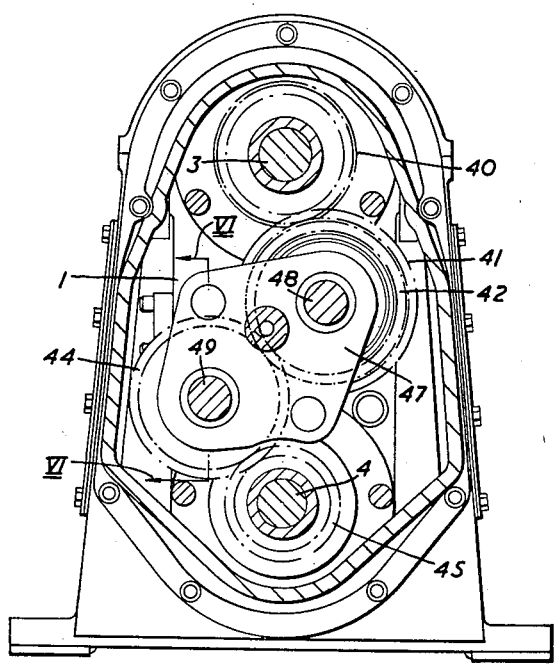
FIGURE 3 is a transverse cross-section taken along the line III—III of FIGURE 1.
Figure 8:
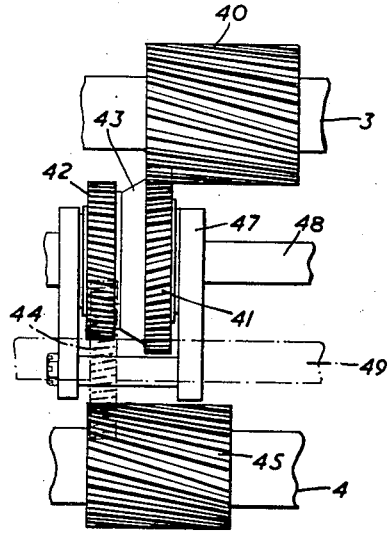
FIGURE 8 is a showing of the meshing relation of gears 40, 41, 42, 44, and 45.
Figure 4:
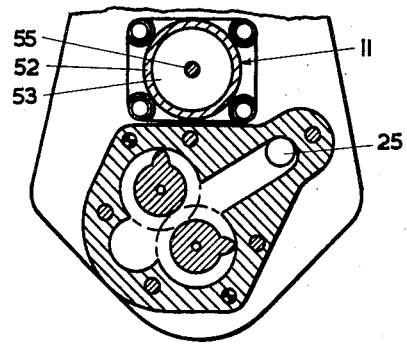
FIGURE 4 is a transverse section on the line IV—IV of FIGURE 1.
Figure 5:
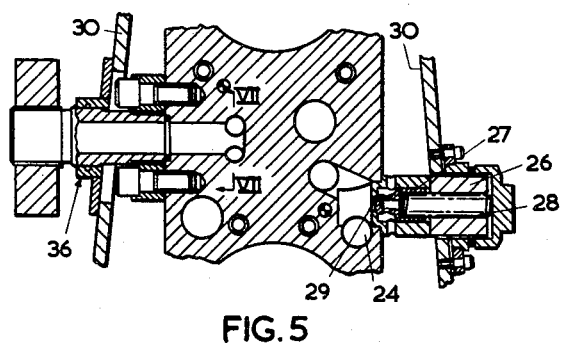
FIGURE 5 is a part transverse section on the line V—V of FIGURE 1.
Figures 6, 7:
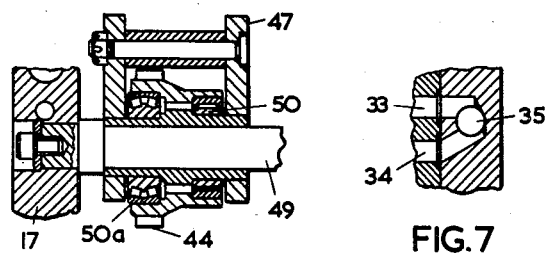
FIGURE 6 is a section taken on the line VI—VI of FIGURE 3.
FIGURE 7 is a part section on the line VII—VII of FIGURE 5.

The pump comprises a cylinder block 1 having a number of cylinders 2, in this case five, upper and lower cam shafts 3, 4 for driving in each cylinder a pair of opposed pistons 7, 8, a gear box 9, a first stage pump 10, and a gearbox control 11. Drive is applied to the upper cam shaft 3 and through the gearbox to the lower cam shaft and via the lower cam shaft to the first stage pump 10. The first stage pump 10 will feed oil to the cylinders whence it will be driven by the pistons to a high pressure outlet. Each cam shaft includes an eccentric 12 in respect of each piston. Each eccentric is preferably in the form of a double row crowded roller race, the outer race 13 being in contact with the outer end of the piston and the inner race being integral with the cam shaft. In operation the outer race will not rotate but will rock to give the desired motion to the piston. Bronze separators 14 are provided between the outer races and perform the dual function of spacing the races and providing a bearing surface. Each cam shaft is mounted in double row spherical roller races 15, 16, these races being capable of carrying both journal and thrust loads. The bearings are mounted in heavy steel end members 17, 18 bolted to the ends of the cylinder block. Each cylinder is provided with an inlet port 20 and an outlet port 21. The inlet port is controlled by a freely floating valve 22 the head of which controls communication between the cylinder and a gallery 23. The gallery 23 meets the passage 24, itself suitably coupled to the outlet 25 (FIGURE 4) of the first stage pump adjacent a pressure relief valve 26. The pressure relief valve comprises a member 27 urged by spring 28 to close a port 29 communicating between the junction of the gallery 23 and passage 24 and the interior of the pump casing 30. In operation, should the first stage pump deliver in excess of the amount required by the piston stage, the relief valve will open. Each inlet valve has its inner end exposed to the pressure in the cylinder and its stem end exposed to first stage pressure. During outward movement of the two pistons, first stage pressure will lift the inlet valve since the outer face of the head is of greater area than the outer end portion of the stem, and as soon as outward movement ceases pressure in the cylinder and in the port 23 will be equal, there will be no flow, and the pressure acting on the area of the stem will close the valve. The outlet valve in each cylinder comprises a valve member 31 loaded by spring 32 to close communication between the port and a pair of outlet galleries 33, 34. These outlet galleries communicate with a main outlet passage 35 (FIGURE 7), in the heavy steel member 17, a suitable union member 36 being secured to the member 17 (FIGURE 5).

It will be appreciated that if the two cam shafts are driven at the same speed, the angular relationship of one to the other being such that the two pistons in a cylinder are moved inwardly simultaneously, the fluid displaced will be equal to the area of one piston multiplied by the combined stroke of the pistons. If however one cam shaft is displaced one half revolution relative to the other, then while one piston is moving inwardly the other will be moving outwardly and hence the distance between the inner ends of the pistons will be constant and fluid displacement will be zero. Therefore any output from maximum to zero may be obtained by varying the angular relationship of the cam shafts within an angular change of 180°. In order to provide the necessary angular change between the cam shafts during running, the gearbox 9 is provided. As previously indicated the drive is applied to the cam shaft 3 and is carried through to cam shaft 4 by the gearbox.

Upper cam shaft 3 carries a helical gear 40 which is considerably wider than its mating gear and has a right-hand helix. The mating gear has a left-hand helix and is one of a pair of gears 41, 42 formed on a common blank 43. The gear 42 has a right-hand helix and drives an idler 44 (FIGURE 6), the idler having a left-hand helix, which in turn drives a final gear 45 carried by the lower cam shaft 4, this final gear having a right-hand helix, and again being considerably wider than its mating idler. Each of the intermediate gears between gears 40 and 45 are mounted on roller bearings in a cage 47, the cage being movable along stationary shafts 48, 49. Thus the blank 43 on which are formed intermediate gears 41 and 42 is mounted on rollers 46 and 46a whilst the other intermediate gear 44 is mounted on bearings 50 and 50a.

If the driving cam shaft 3 remains stationary and the cage 47 is moved axially away from the cylinder block, then the first gear 41 of the intermediate gears will make a rotating motion due to the helix angle, and this rotating action will be imparted to all other gears through the train, thus causing the lower cam shaft 4 to rotate. However, axial movement of the cage 47 would cause the lower cam shaft 4 to rotate if the idler 44 were held stationary, and since the helix angle of the idler gear 44 driving the lower cam shaft is of the opposite helix angle to the first gear 40, the lower cam shaft is caused to rotate by an amount equal to the sum of the rotational movement of both cases considered separately. This movement would in fact be equal to twice the rotational movement of the gear 41 meshing with the gear 40 if all gears were of the same diameter. This however is impossible since the escond gear 42 formed on the blank 43 must be of such a diameter that its teeth are clear of the teeth of the gear 40 when axial movement of the cage causes the gear 42 to lie within the end planes of the gear 40. It is at present preferred to arrange the gearing so that the ratio between the gear 40 and the gear 41 is 1.33:1 stepping down in speed, the ratio between the gear 42 and the gear 45 is again 1.33:1 stepping up in speed. Thus, the two cam shafts run at the same rotational speed.

The unequal ratio of gearing has an effect on the angular movement imparted by axial movement of the cage of gears. Thus, when gear 40 is stationary and cage 47 is moved axially, gear 41 and hence gear 42 rotate $Y°$, the actual angular change per unit of movement of the cage depending upon the helix angle. Idler gear 44 merely serves to transfer the drive to gear 45 which will rotate $Y \times 1.33°$. The axial movement of gear 44 is the same as the axial movement of the cage 47, therefore if idler 44 was stationary, gear 45 would rotate an amount equal to the rotation of gear 41 times the ratio of the diameters of gears 41 and 45, since the angular change is related to the diameter of the rotating gear for a given axial movement. In the case illustrated this ratio is 1.556:1 and therefore the rotation imparted to the gear 45 purely as a result of the axial movement between gear 44 and gear 45 will be $Y \times 1.566$. Therefore the total angular movement of gear 45 will be $$Y \times (1.566 + 1.33) = Y \times 2.896$$

From this is determined the amount of axial movement of the cage 47 required to cause the gear 45 to rotate one half revolution relative to the first gear, 40.

Analysis of the thrust loads resulting from the helix angle of the gearing will show that if the cam shaft 3 is rotated in an anticlockwise direction when looked at from the driving end, the resultant thrust on the cage 47 will tend to move the cage away from the cylinder block. The assembly is therefore arranged so that with the cage adjacent the cylinder block the pistons are giving maximum output, whilst with the cage at the opposite end of its movement the output is zero. In order to control the movement of the cage, first stage delivery is fed to the control 11 which comprises a cylinder 52 in which is a piston 53, the stem of which bears against the cage. The area of the piston 53 is such that at some pressure less than the working pressure of the first stage pump, the load of the piston will balance the thrust exerted by the cage. A spill valve 54 formed by apertures in the hollow end of a spindle 55 which rides in a bore 56 in the piston is provided whereby fluid in the cylinder is permitted to escape into the pump casing by movement of the spindle 55. Upon escape of fluid the thrust exerted by the cage will move the cage and the piston until such time as the spill valve is again closed, to a point at which the escape of fluid is equal to the rate of supply from the gear pump, when further movement is prevented by the fluid remaining in the cylinder. Conversely if the valve is completely closed then the piston will move the cage until the required degree of opening is obtained. Since the valve is in hydraulic balance only a very small force is necessary to move it. If desired the valve may be operable remotely and the flow of oil to the cylinder 52 is restricted in order to limit the rate of movement of the piston and to make a not excessive demand upon fluid available from the first stage. The embodiment illustrated is intended to have one inch diameter pistons, to be a 60 H.P. unit and to be capable of operating at up to 4,500 lbs./sq. inch. The first stage pressure would preferably be of the order of 250–300 lbs./sq. inch.

It will be appreciated that the form of gearing described and illustrated is applicable to mechanisms other than variable delivery pumps.

I claim:

1. A gear box for a variable delivery high pressure hydraulic pump, said gear box comprising, in combination, a rotatable driving helical gear and a rotatable driven helical gear, a plurality of intermediate helical gears transmitting rotational movement between said driving and driven gears, said intermediate gears being supported for axial movement and being rotatable about a plurality of axes of rotation, all of said gears having teeth, the teeth of said intermediate gears meshing with said teeth of said driving and driven gears, said intermediate gears including three gears, the ratio of said driving gear to a first and a second one of said intermediate gears being fractional, the third one of said intermediate gears comprising an idler, and the overall ratio of said driving and driven gears being unity, and displacement means axially adjusting the position of said intermediate gears relative to said driving and driven gears, whereby axial movement of said intermediate gears effects angular relative movement between said driving and driven gears.

2. A gear box as set forth in claim 1, in which the ratios between said gears amplify the angular movement of the driven gear relative to the driving gear in response to axial movement of said intermediate gears.

3. A gear box as set forth in claim 2, further comprising a cage supporting all of said intermediate gears, and at least one shaft supporting said cage for said axial movement by said displacement means.

4. A gear box as set forth in claim 3, in which the sum of forces acting upon said gears carried by said cage impart to said cage an axial force effecting movement thereof longitudinally in one direction along said shaft.

5. A gear box according to claim 4, in which the cage is coupled to a piston movable in a cylinder, means being provided for supplying fluid under pressure to the cylinder.

6. A gear box according to claim 5, including a spill valve in the cylinder for releasing fluid from the cylinder.

7. A gear box according to claim 6, in which the means for supplying fluid to the cylinder comprises a first pump geared to the driving member.

References Cited in the file of this patent

UNITED STATES PATENTS

| 1,965,288 | Hillier | July 3, 1934 |
| 2,219,126 | Brigham | Oct. 22, 1940 |
| 2,304,770 | Nichols | Dec. 8, 1942 |
| 2,327,787 | Heintz | Aug. 24, 1943 |
| 2,397,126 | Buhrendorf | Mar. 26, 1946 |

FOREIGN PATENTS

| 620,430 | Great Britain | Mar. 24, 1949 |
| 859,239 | Germany | Dec. 11, 1952 |